United States Patent
Yen et al.

(10) Patent No.: US 8,203,679 B2
(45) Date of Patent: Jun. 19, 2012

(54) OPTICALLY COMPENSATED BIREFRINGENCE MODE LIQUID CRYSTAL DISPLAY PANEL

(75) Inventors: Ze-Yu Yen, Taipei (TW); Ding-Jen Chen, Chiayi County (TW); Ya-Ting Wu, Hsinchu County (TW); Cho-Ying Lin, Yunlin County (TW)

(73) Assignees: Taiwan TFT LCD Association, Hsinchu (TW); Chunghwa Picture Tubes, Ltd., Taoyuan (TW); Au Optronics Corporation, Hsinchu (TW); Hannstar Display Corporation, New Taipei (TW); Chi Mei Optoelectronics Corporation, Tainan County (TW); Industrial Technology Research Institute, Hsinchu (TW)

( * ) Notice: Subject to any disclaimer, the term of this patent is extended or adjusted under 35 U.S.C. 154(b) by 454 days.

(21) Appl. No.: 12/613,517

(22) Filed: Nov. 5, 2009

(65) Prior Publication Data

US 2011/0069266 A1    Mar. 24, 2011

(30) Foreign Application Priority Data

Sep. 24, 2009   (TW) ............................... 98132335 A

(51) Int. Cl.
  *G02F 1/1337*   (2006.01)
  *G02F 1/139*   (2006.01)
(52) U.S. Cl. .................. 349/129; 349/123; 349/177
(58) Field of Classification Search .................. 349/123, 349/127, 128, 129, 136, 160, 177, 183
See application file for complete search history.

(56) References Cited

U.S. PATENT DOCUMENTS

| | | | |
|---|---|---|---|
| 4,566,758 A | 1/1986 | Bos | |
| 6,437,844 B1 | 8/2002 | Hattori et al. | |
| 6,597,424 B2 | 7/2003 | Hattori et al. | |
| 6,710,832 B2 | 3/2004 | Hattori et al. | |
| 6,852,374 B2 | 2/2005 | Mizusaki et al. | |
| 6,859,246 B2 | 2/2005 | Konno et al. | |
| 7,215,397 B2 | 5/2007 | Inoue et al. | |
| 7,253,859 B2 * | 8/2007 | Ishizaki | 349/117 |
| 7,382,427 B2 | 6/2008 | Choi | |
| 7,540,975 B2 * | 6/2009 | Lin et al. | 252/299.01 |
| 2005/0260334 A1 | 11/2005 | Kwok et al. | |
| 2007/0263151 A1 | 11/2007 | Hsiao et al. | |
| 2009/0226629 A1 * | 9/2009 | Yen et al. | 427/510 |
| 2010/0128025 A1 * | 5/2010 | Yen et al. | 345/214 |

FOREIGN PATENT DOCUMENTS

CN      101556406 A      10/2009

* cited by examiner

*Primary Examiner* — Dung Nguyen
*Assistant Examiner* — Tai Duong
(74) *Attorney, Agent, or Firm* — Jianq Chyun IP Office

(57) ABSTRACT

An OCB mode liquid crystal display panel having a plurality of pixel regions includes a first substrate, a second substrate, dot liquid crystal polymer patterns and an OCB liquid crystal material. The first substrate has a first alignment treated layer thereon, the second substrate has a second alignment treated layer thereon, and the dot liquid crystal polymer patterns are on the first alignment treated layer and the second alignment treated layer. Each of the dot liquid crystal polymer patterns has an area between 1~225 μm². The second substrate is opposite to the first substrate, and the OCB liquid crystal material is between the first substrate and the second substrate.

12 Claims, 8 Drawing Sheets

OPTICALLY COMPENSATED BIREFRINGENCE MODE LIQUID CRYSTAL DISPLAY PANEL

CROSS-REFERENCE TO RELATED APPLICATION

This application claims the priority benefit of Taiwan application serial no. 98132335, filed on Sep. 24, 2009. The entirety of the above-mentioned patent application is hereby incorporated by reference herein and made a part of specification.

BACKGROUND OF THE INVENTION

1. Field of the Invention

The present invention relates to a liquid crystal display (LCD) panel. More particularly, the present invention relates to an optically compensated birefringence (OCB) mode LCD panel.

2. Description of Related Art

To satisfy a quality demand of dynamic images of a liquid crystal display, various fast-response LCD techniques are continuously provided, and one of those is an OCB mode LCD. Because the OCB mode LCD has advantages of wide viewing angle and fast response (less than 5 ms), some techniques about driving OCB mode LCD are developed.

However, one of disadvantages of the OCB mode LCD is that a transition from a splay state to a bend state is necessary for driving the OCB mode LCD, so that the OCB mode LCD requires a high voltage to perform the transition for starting a display driving. However, the relatively high voltage not only increases a cost of the liquid crystal panel, but may also cause damage to the liquid crystal panel. U.S. Pat. No. 6,437,844, filed in 1997, provides a seed concept for an OCB mode LCD. Some regions having high pre-tilt angle serving as the seed is designed in the OCB mode LCD to speed up the transition. However, a higher voltage is needed to transit liquid crystal molecules from a splay state to a bend state, and a higher operation voltage is also required. In addition, etching and developing processes are also required to form the regions having high pre-tilt angle, and therefore this method is complex.

U.S. Pat. No. 6,597,424, filed in 2002, provides a seed structure for an OCB mode LCD. Some protrusions are designed around electrode regions to serve as the seed so as to speed up the transition. However, a higher voltage is needed to transit liquid crystal molecules from a splay state to a bend state, and a higher operation voltage is also required. In addition, the number of the seed formed by the method is limited, and the seed uniformity is not good.

U.S. Pat. No. 6,710,832, filed in 2001, also provides a seed structure for an OCB mode LCD. A non-uniform aligning surface is formed in the LCD such that liquid crystal molecules in some regions of the LCD have higher pre-tilt angle. Hence, a transition seed may be generated during driving the LCD so as to speed up the transition from a splay state to a bend state. However, a higher voltage is needed to transit the liquid crystal molecules from a splay state to a bend state, and the operation voltage is still too large. In addition, the number of the seed formed by the method is not easily controlled, and is easily to have light leakage issue.

U.S. Pat. No. 6,859,246, filed in 2002, provides another seed structure for an OCB mode LCD. A saw-tooth surface composed of slant surface structures is formed in a non-display region of a LCD, such that liquid crystal molecules in the region have higher pre-tilt angle. Hence, a transition seed may be generated during driving the LCD so as to speed up the transition from a splay state to a bend state. However, a higher voltage is needed to transit the liquid crystal molecules from a splay state to a bend state, and the operation voltage is still too large. In addition, etching and developing processes are required, and therefore this method is complex.

U.S. Pat. No. 7,215,397, filed in 2002, provides another seed method for an OCB mode LCD. A secondary alignment is performed on the alignment layers with developing and etching processes, such that variable alignment directions are formed in a single alignment layer. After assembling the LCD, 90° horizontal-twisted regions are formed to serve as an OCB seed to speed up the transition. However, a higher voltage is needed to transit liquid crystal molecules from a splay state to a bend state, and a higher operation voltage is also required. In addition, etching and developing processes are required, and therefore this method is complex.

For the foregoing, many techniques have been developed to speed up the transition from a splay state to a bend state. However, in addition to the transition from a splay state to a bend state is needed, a higher transition voltage is also required to drive the LCD.

SUMMARY OF THE INVENTION

An OCB mode liquid crystal display panel having a plurality of pixel regions includes a first substrate, a second substrate, dot liquid crystal polymer patterns and an OCB liquid crystal material. The first substrate has a first alignment treated layer thereon, the second substrate has a second alignment treated layer thereon, and the dot liquid crystal polymer patterns are on the first alignment treated layer and the second alignment treated layer. Each of the dot liquid crystal polymer patterns has an area between 1~225 $\mu m^2$. The second substrate is opposite to the first substrate, and the OCB liquid crystal material is between the first substrate and the second substrate.

In order to make the aforementioned and other features and advantages of the present invention more comprehensible, several embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
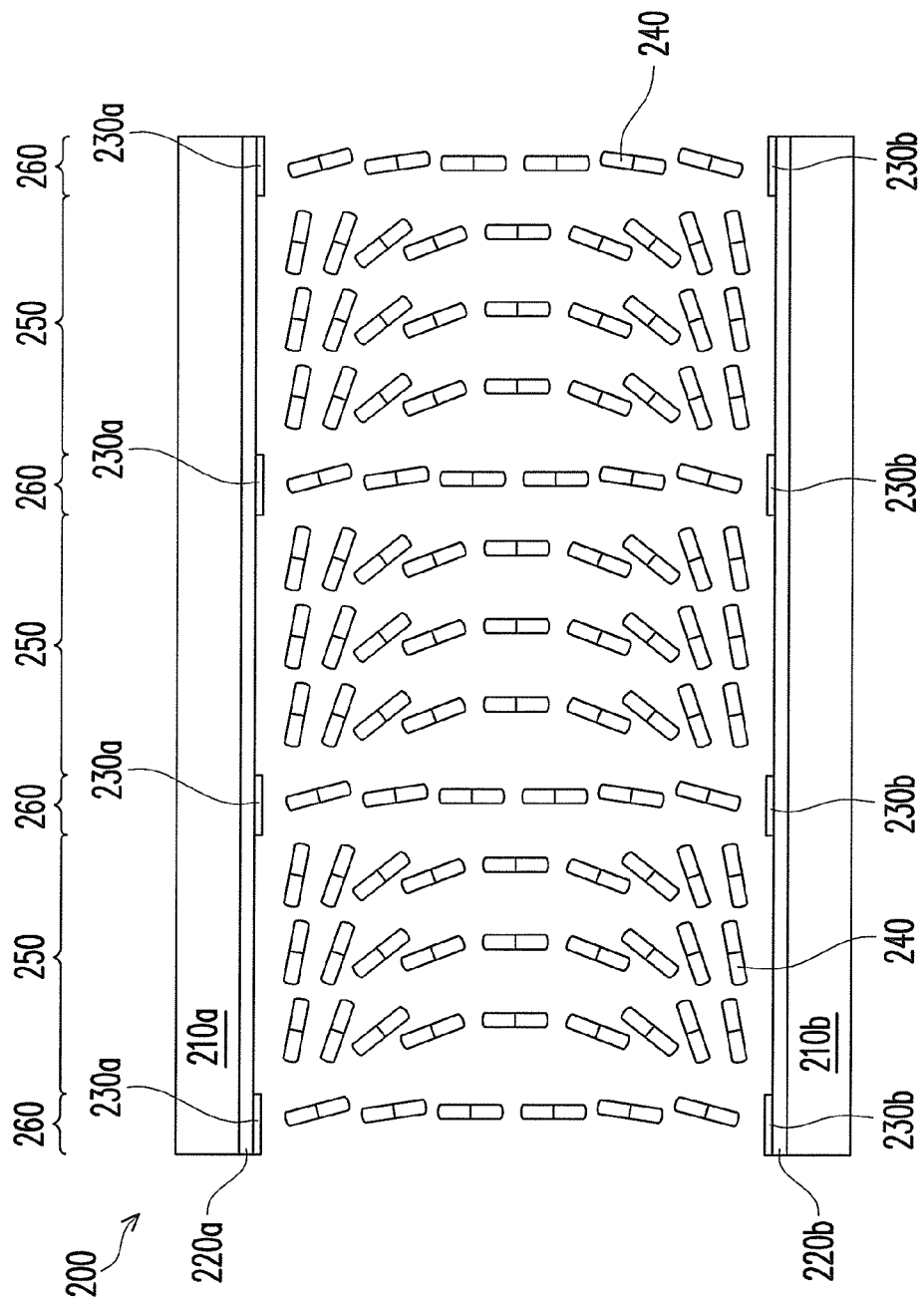
FIG. 1 is a cross-sectional view of an OCB mode LCD panel according to an embodiment of the present invention.
Figure 2A:
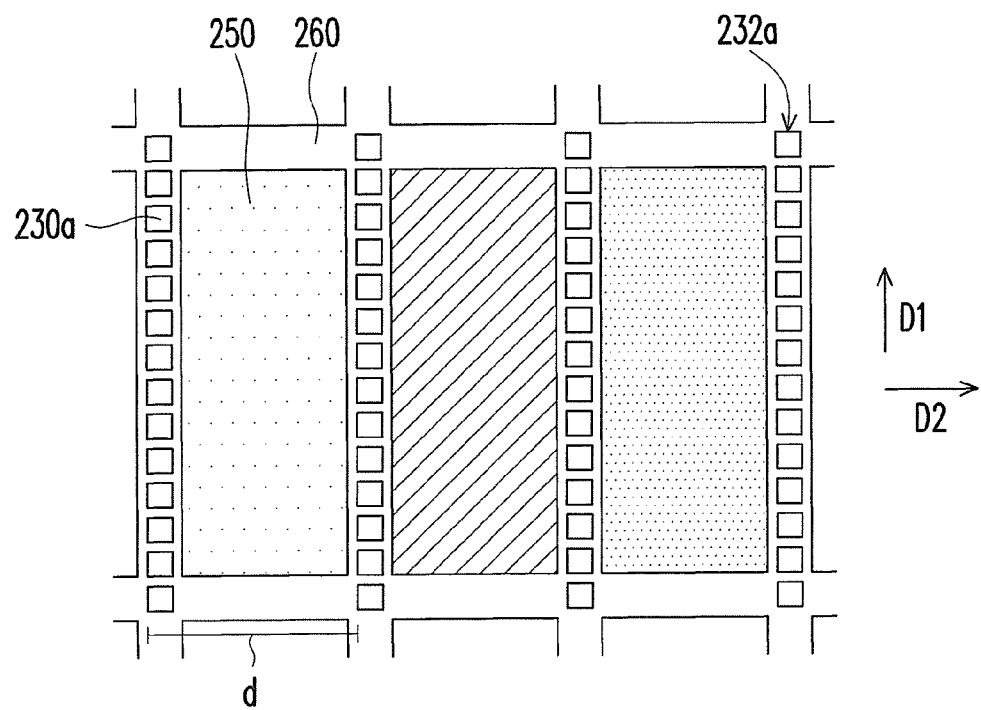
FIG. 2A is a top view of a first substrate of an OCB mode LCD panel in FIG. 1.
Figure 2B:
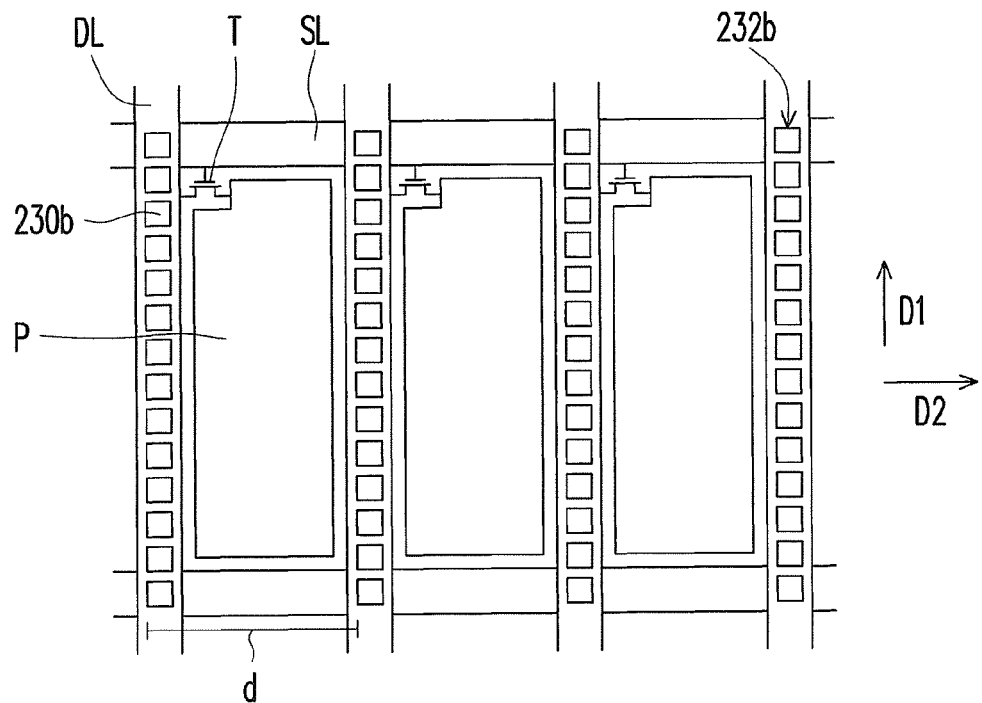
FIG. 2B is a top view of a second substrate of an OCB mode LCD panel in FIG. 1.

FIG. 1 is a cross-sectional view of an OCB mode LCD panel according to an embodiment of the present invention. FIG. 2A is a top view of a first substrate of an OCB mode LCD panel in FIG. 1. FIG. 2B is a top view of a second substrate of an OCB mode LCD panel in FIG. 1. Referring to FIGS. 1, 2A and 2B, the OCB mode LCD panel 200 includes a first substrate 210a, a second substrate 210b opposite to the first substrate 210a, dot liquid crystal polymer patterns 230a on the first substrate 210a, dot liquid crystal polymer patterns 230b on the second substrate 210b and an OCB liquid crystal material 240 between the first substrate 210a and the second substrate 210b.

In an embodiment, one of the first substrate 210a and the second substrate 210b is an active device array substrate and the other one of the first substrate 210a and the second substrate 210b is a color filter substrate. In the embodiment, the first substrate 210a is a color filter substrate and the second substrate 210b is an active device array substrate for illustration, but the present invention does not limited herein. According to another embodiment, the first substrate 210a is an active device array substrate and the second substrate 210b is a color filter substrate. Generally, as shown in FIG. 2A, the color filer substrate comprises a light shielding pattern layer 260 and a color filter array 250. The material of the light shielding pattern layer 260 comprises a metal or a light shielding resin. The color filter array 250 comprises red, green and blue filter patterns, which are respectively disposed in a region defined by the light shielding pattern layer 260. In addition, as shown in FIG. 2B, the active device array substrate comprises data lines DL, scan lines SL, active devices T electrically connected to the data lines DL and the scan lines SL, and pixel electrodes P electrically connected to the active devices T. Usually, the light shielding pattern layer 260 is disposed corresponding to the scan lines SL and data lines DL, and thus the region in which the scan lines SL, the data lines DL and the light shielding pattern layer 260 disposed is also called a light shielding region. The pixel electrodes P are disposed corresponding to the color filter array 250, and thus the region in which the pixel electrodes P and the color filter array 250 disposed is also called pixel regions. Therefore, the pixel region is a region which is enclosed by the light shielding pattern layer 260 and enclosed by the adjacent data lines DL and the adjacent scan lines SL.

In the embodiment, an alignment treated layer 220a is disposed on the first substrate 210a, and another alignment treated layer 220b is disposed on the second substrate 210b. The alignment treated layer 220a, 220b are respectively an alignment treated organic material layer or an alignment treated inorganic material layer. The alignment treated inorganic material layer may be an alignment treated electrode layer or an alignment treated insulating layer, and the alignment treated inorganic material layer comprises diamond-like carbon (DLC), indium tin oxide (ITO), silicon oxide (SiOx), silicon nitride (SiNx) or other inorganic material. The alignment treated organic material layer may be an alignment layer, an alignment treated color filter layer, an alignment treated planarization layer or the like, and the alignment treated organic material layer comprises polyimide, polyamic acid (PAA), polyamide, polyvinyl alcohol (PVA) polyvinyl cinnamat (PVCi) or other polymer material. In addition, an alignment treatment to the organic material layer or the inorganic material layer includes an ion beam alignment, an UV alignment, a plasma alignment, a SiO2 oblique evaporation alignment or a rubbing alignment.

In addition, the dot liquid crystal polymer patterns 230a are disposed on the alignment treated layer 220a of the first substrate 210a, and the dot liquid crystal polymer patterns 230b are disposed on the alignment treated layer 220b of the second substrate 210b. In the embodiment, the dot liquid crystal polymer patterns 230a, 230b are respectively disposed on the light shielding pattern layer 260 and the data lines DL. However, the present invention does not limit herein. According to another embodiment, the dot liquid crystal polymer patterns 230a, 230b are respectively disposed on the light shielding pattern layer 260 and the scan lines SL. Moreover, the dot liquid crystal polymer patterns 230a, 230b are disposed corresponding to each other, and preferably the dot liquid crystal polymer patterns 230a, 230b are aligned to each other.

In particular, each of the dot liquid crystal polymer patterns 230a, 230b has an area between 1~225 $\mu m^2$. Each of the dot liquid crystal polymer patterns 230a, 230b may have a rectangle shape, a square shape, a circle shape, an irregular shape or other polygon shape.

The dot liquid crystal polymer patterns 230a, 230b are formed on the alignment treated layers 220a, 220b by the following steps, for example. A reactive liquid crystal monomer layer is coated on the substrates by spin coating, screen printing, offset printing, inject printing, slot die coating or nano-imprinting. The reactive liquid crystal monomer layer may make the liquid crystal may behaving vertical arrangement. Next, an UV exposure-polymerization process is performed to a selective region of the reactive liquid crystal monomer layer. A region of the reactive liquid crystal monomer layer which is not exposed is removed by solvent removing with deionized water, ethanol, isopropanol, acetone, methyl ethyl ketone or other development solvent, or by laser etching, so as to form a liquid crystal polymer pattern which makes the liquid crystal may behaving vertical arrangement.

It should be noted that in the embodiment, as shown in FIG. 2A and FIG. 2B, the dot liquid crystal polymer patterns 230a, 230b are closely arranged into linear structures 232a, 232b, and the linear structures 232a, 232b are parallel to each other. The extending direction D1 of the linear structures 232a, 232b is the same with or different from the alignment direction D2 of the alignment treated layer 220a. In the embodiment, the extending direction D1 is perpendicular to the alignment direction D2. According to another embodiment, the extending direction D1 and the alignment direction D2 have another angle therebetween or are parallel to each other.

Figure 3A:
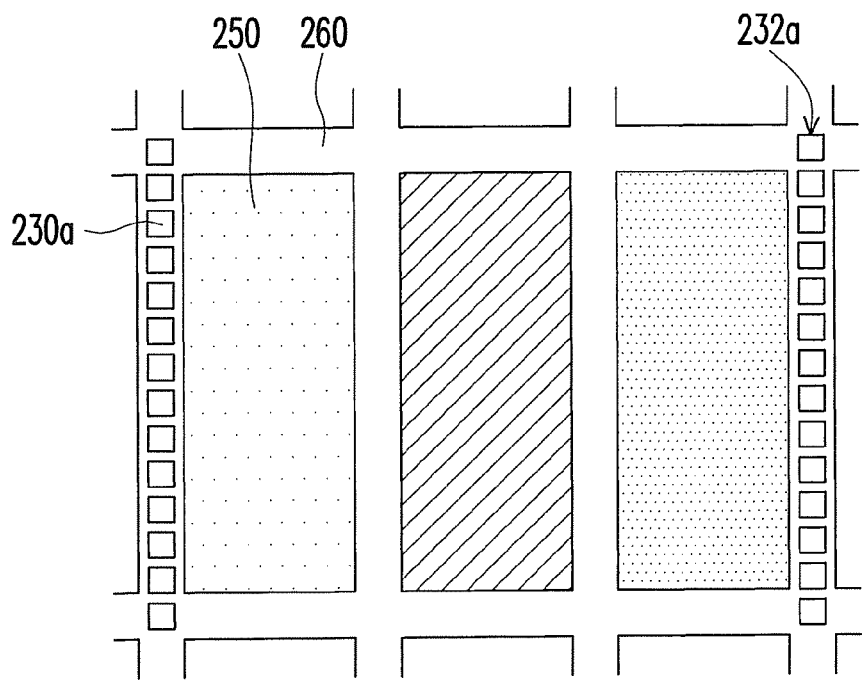
FIG. 3A is a top view of a first substrate of an OCB mode LCD panel according to an embodiment of the present invention.
Figure 3B:
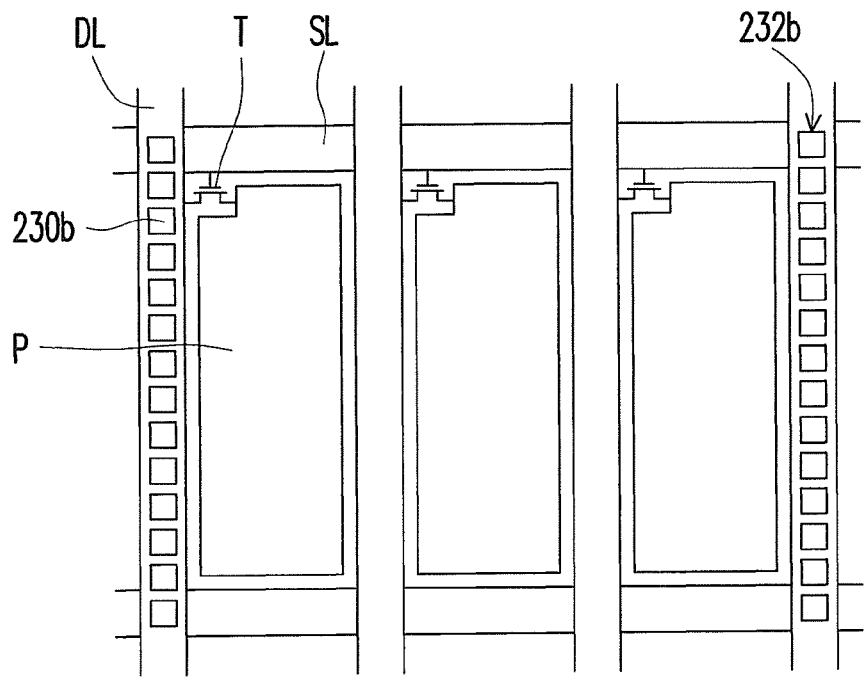
FIG. 3B is a top view of a second substrate of an OCB mode LCD panel according to an embodiment of the present invention.

In addition, a distance between the adjacent dot liquid crystal polymer patterns 230a is between 1~25 μm, and a distance between the adjacent dot liquid crystal polymer patterns 230b is between 1~25 μm. Each of the dot liquid crystal polymer patterns 230a, 230b has an area between 1~225 μm². A distance d between the adjacent linear structures 232a is between 50~200 μm, and a distance d between the adjacent linear structures 232b is between 50~200 μm. In the embodiment shown in FIG. 2A and FIG. 2B, the adjacent linear structures 232a or 232b are away from each other by one pixel region. However, the present invention does not limit herein. According to another embodiment, the adjacent linear structures 232a or 232b are away from each other by two pixel regions, three pixel regions (as shown in FIG. 3A and FIG. 3B), or more than three pixel regions.

Figure 8:
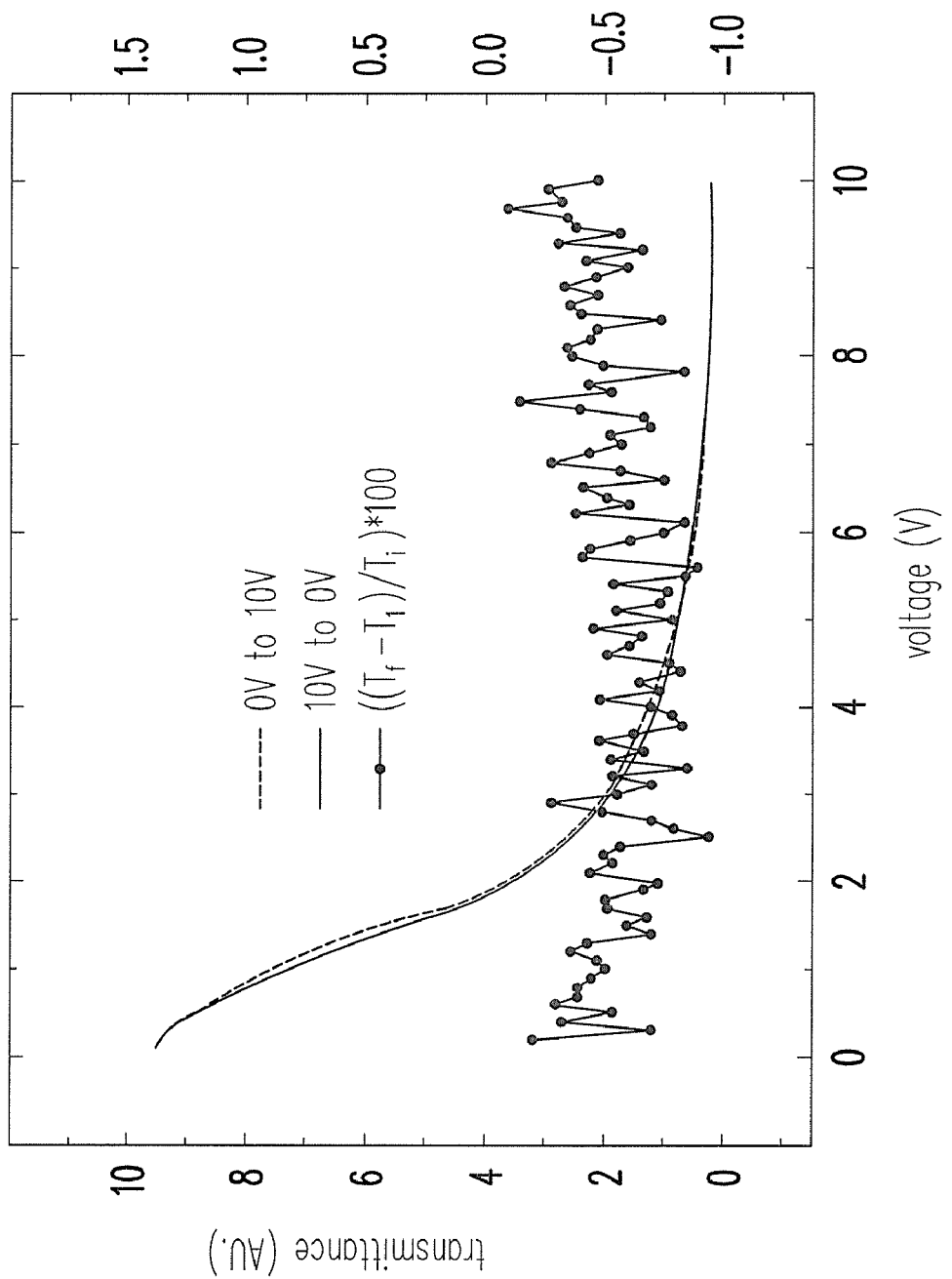
FIG. 8 is a drawing showing a voltage-transmittance curve of an OCB mode LCD panel according to an embodiment of the present invention.

In the embodiment of FIG. 1, FIG. 2A and FIG. 2B, the dot liquid crystal polymer patterns 230a, 230b are closely arranged into linear structures 232a, 232b. When no voltage is applied on the OCB mode LCD panel, the liquid crystal molecules 240 on the dot liquid crystal polymer patterns 230a, 230b are in a bend state or a vertical arrangement state, and the liquid crystal molecules 240 in the other region is in a splay state. After a voltage is applied on the OCB mode LCD panel, the liquid crystal molecules 240 in the splay state are induced into the bend state. Therefore, the transition from a splay state into a bend state is not required for the liquid crystal molecules 240 in the OCB mode LCD panel. FIG. 8 shows a transition from a splay state into a bend state is not required in the OCB mode LCD panel according to the embodiment of the present invention.

Figure 4A:
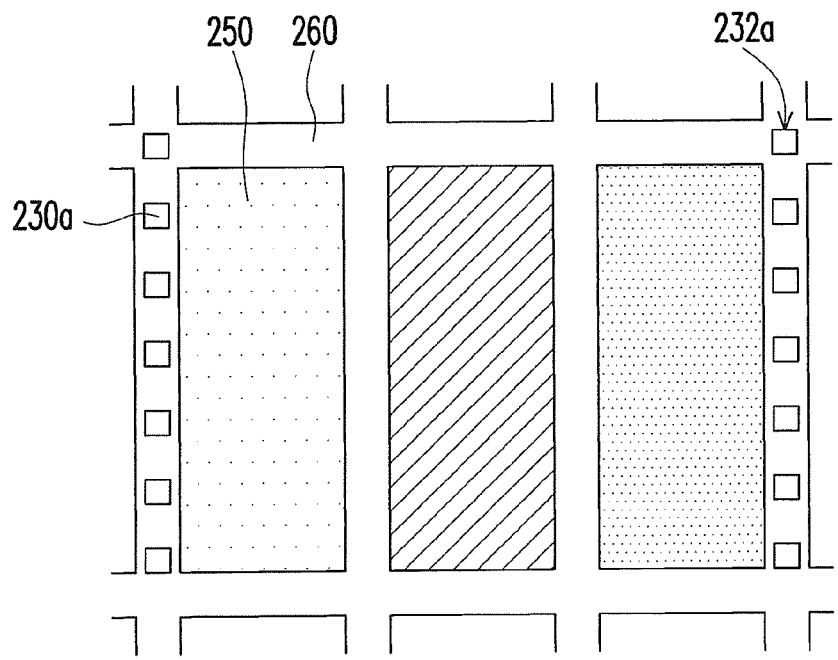
FIG. 4A is a top view of a first substrate of an OCB mode LCD panel according to an embodiment of the present invention.
Figure 4B:
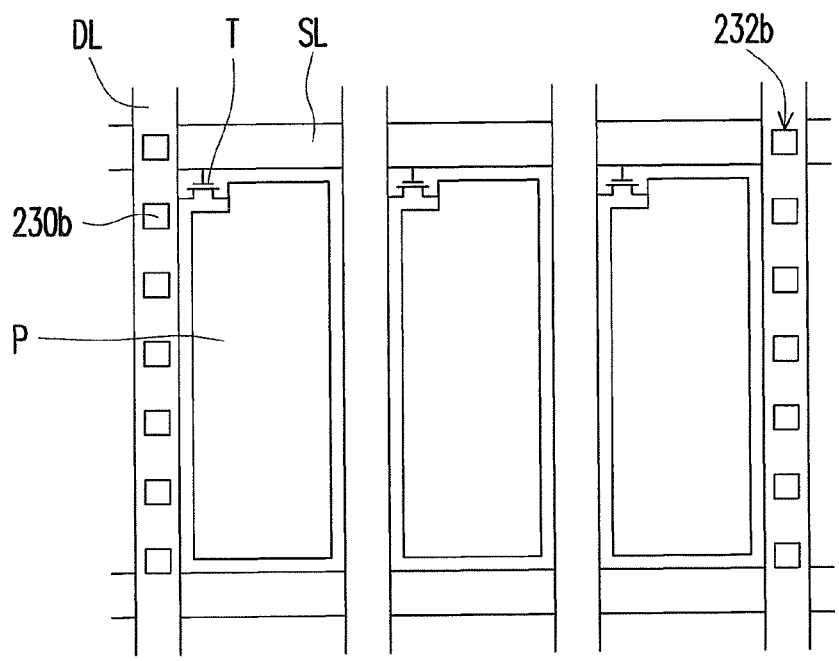
FIG. 4B is a top view of a second substrate of an OCB mode LCD panel according to an embodiment of the present invention.

In another embodiment of the present invention, the density of the dot liquid crystal polymer patterns 230a, 230b may be adjusted. As shown in FIG. 4A and FIG. 4B, the OCB mode LCD panel of the embodiment is similar to that of FIG. 2A and FIG. 2B, and the difference between the two embodiments is the arrangement of the dot liquid crystal polymer patterns 230a, 230b, and is explained as following. FIG. 4A is a top view of a first substrate of an OCB mode LCD panel according to an embodiment of the present invention. FIG. 4B is a top view of a second substrate of an OCB mode LCD panel according to an embodiment of the present invention. Referring to FIG. 4A and FIG. 4B, the density of the dot liquid crystal polymer patterns 230a, 230b is lower. Therefore, the distance between the dot liquid crystal polymer patterns 230a (230b) is larger; or the area of each of the dot liquid crystal polymer patterns 230a, 230b is smaller. Alternatively, the distance between the dot liquid crystal polymer patterns 230a (230b) is larger and the area of each of the dot liquid crystal polymer patterns 230a, 230b is smaller. However, the distance between the adjacent dot liquid crystal polymer patterns 230a is still between 1~25 μm. The distance between the adjacent dot liquid crystal polymer patterns 230b is still between 1~25 μm. Each of the dot liquid crystal polymer patterns 230a, 230b still has an area between 1~225 μm². The distance d between the adjacent linear structures 232a is still between 50~200 μm, and a distance d between the adjacent linear structures 232b is still between 50~200 μm.

Figure 5A:
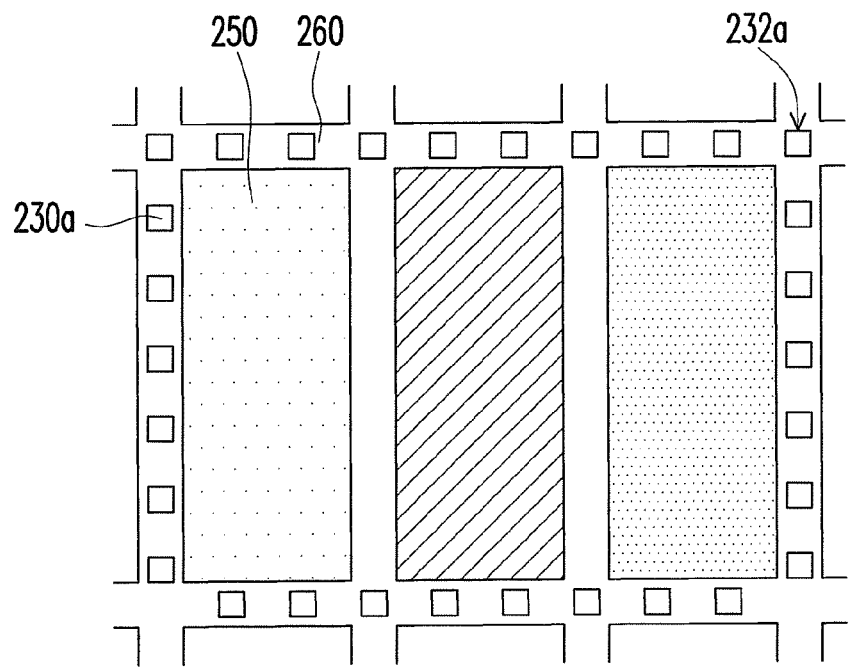
FIG. 5A is a top view of a first substrate of an OCB mode LCD panel according to an embodiment of the present invention.
Figure 5B:
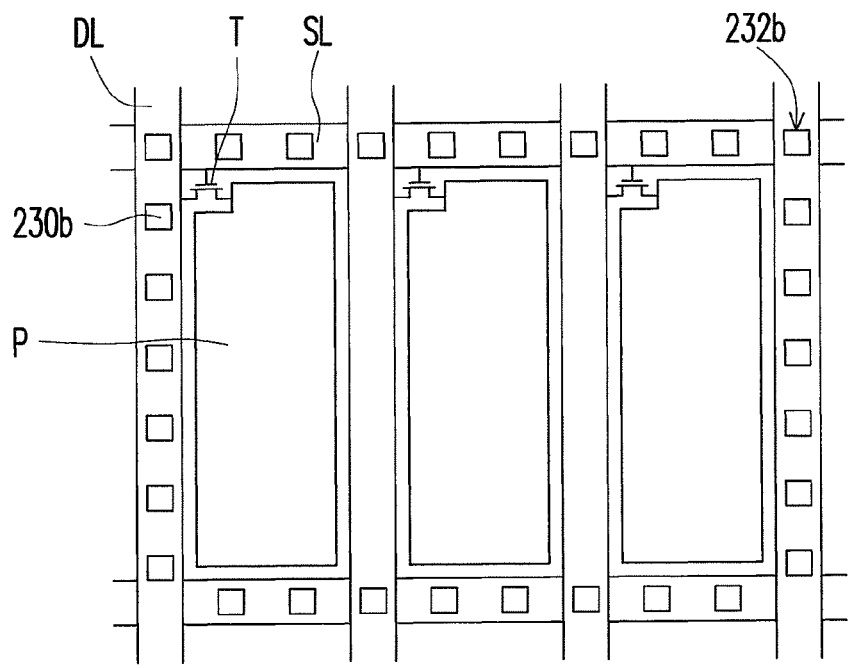
FIG. 5B is a top view of a second substrate of an OCB mode LCD panel according to an embodiment of the present invention.

In addition, the dot liquid crystal polymer patterns are arranged into linear structures in the above embodiments, but the present invention does not limited herein. In another embodiment, the dot liquid crystal polymer patterns may be arranged into ring structures. As shown in FIG. 5A and FIG. 5B, the OCB mode LCD panel of the embodiment is similar to that of FIG. 2A and FIG. 2B, and the difference between the two embodiments is the arrangement of the dot liquid crystal polymer patterns, and is explained as following. FIG. 5A is a top view of a first substrate of an OCB mode LCD panel according to an embodiment of the present invention. FIG. 5B is a top view of a second substrate of an OCB mode LCD panel according to an embodiment of the present invention. Referring to FIG. 5A and FIG. 5B, the dot liquid crystal polymer patterns 230a are arranged into ring structures 232a and the dot liquid crystal polymer patterns 230b are arranged into ring structures 232b. The dot liquid crystal polymer patterns 230a, 230b are disposed on the light shielding pattern layer 260 and the scan lines/data lines SL/DL. Similarly, the distance between the adjacent dot liquid crystal polymer patterns 230a is between 1~25 μm, and the distance between the adjacent dot liquid crystal polymer patterns 230b is between 1~25 μm. Each of the dot liquid crystal polymer patterns 230a, 230b has an area between 1~225 μm².

In the embodiment, if the density of the dot liquid crystal polymer patterns 230a, 230b is lower, the transition voltage of the liquid crystal molecules 240 from a splay state into a bend state is reduced, and the transition speed of the liquid crystal molecules 240 from a splay state into a bend state is increased. For example, a transition voltage of the liquid crystal molecules from a splay state into a bend state in a conventional OCB mode LCD panel is about 15~25V. The transition voltage of the liquid crystal molecules 240 of the OCB mode LCD panel having the dot liquid crystal polymer patterns 230a, 230b therein according to the embodiment is about 3~4V. Because the liquid crystal molecules 240 can be transited from a splay state into a bend state with high speed and low voltage, the OCB mode LCD panel of the embodiment is compliant to the conventional OCB mode LCD panels. That means the compensation films or other optical films of LCD are not required to change.

Figure 6A:
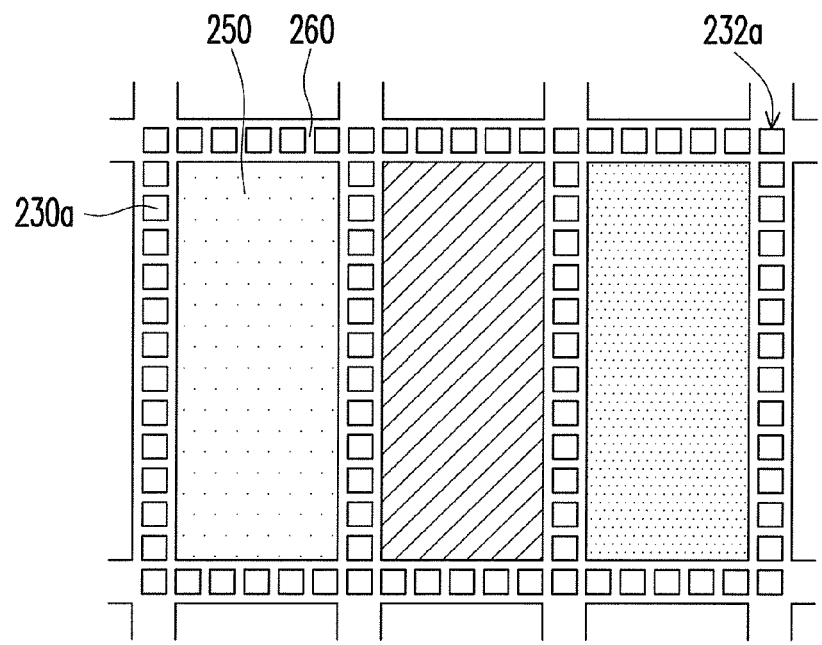
FIG. 6A is a top view of a first substrate of an OCB mode LCD panel according to an embodiment of the present invention.
Figure 6B:
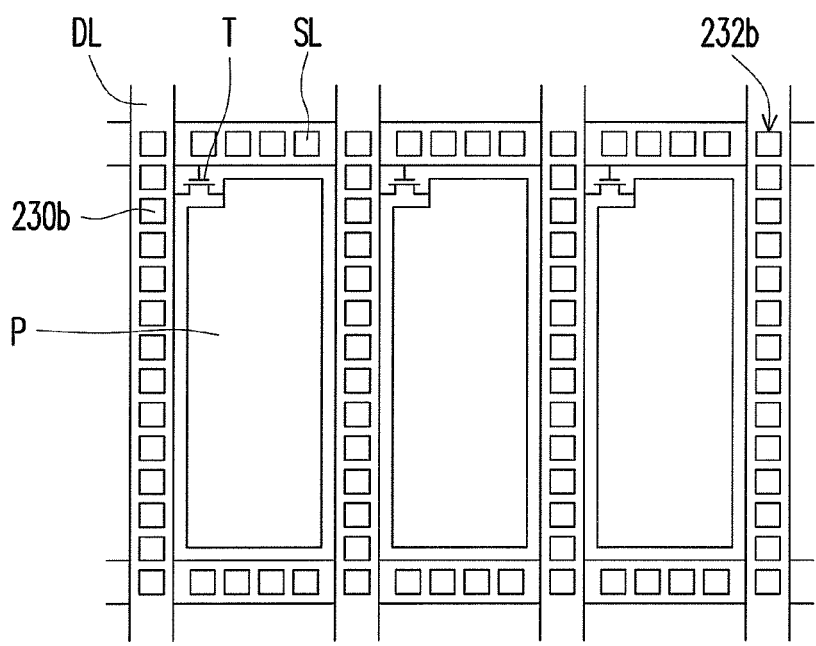
FIG. 6B is a top view of a second substrate of an OCB mode LCD panel according to an embodiment of the present invention.
Figure 7A:
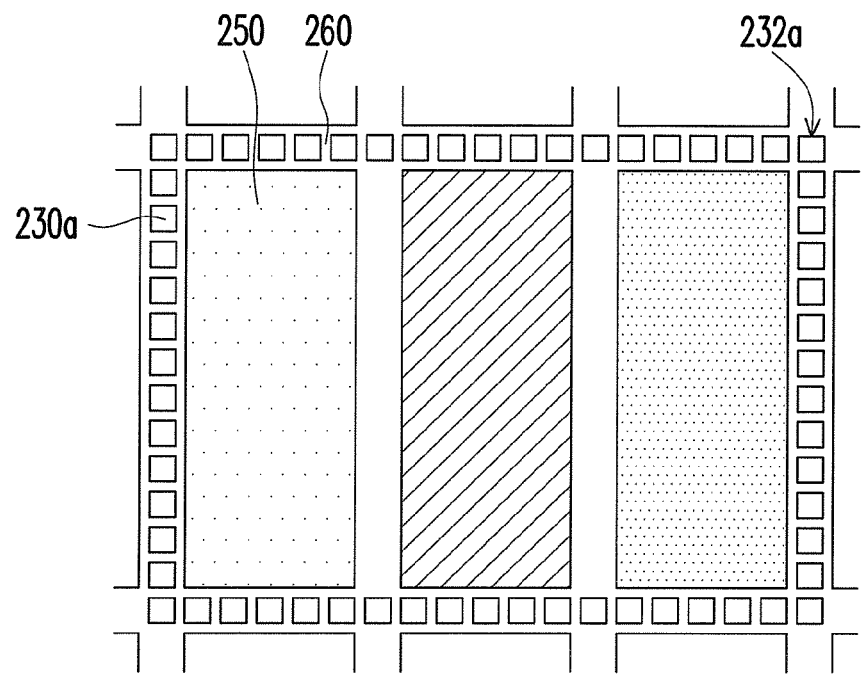
FIG. 7A is a top view of a first substrate of an OCB mode LCD panel according to an embodiment of the present invention.
Figure 7B:
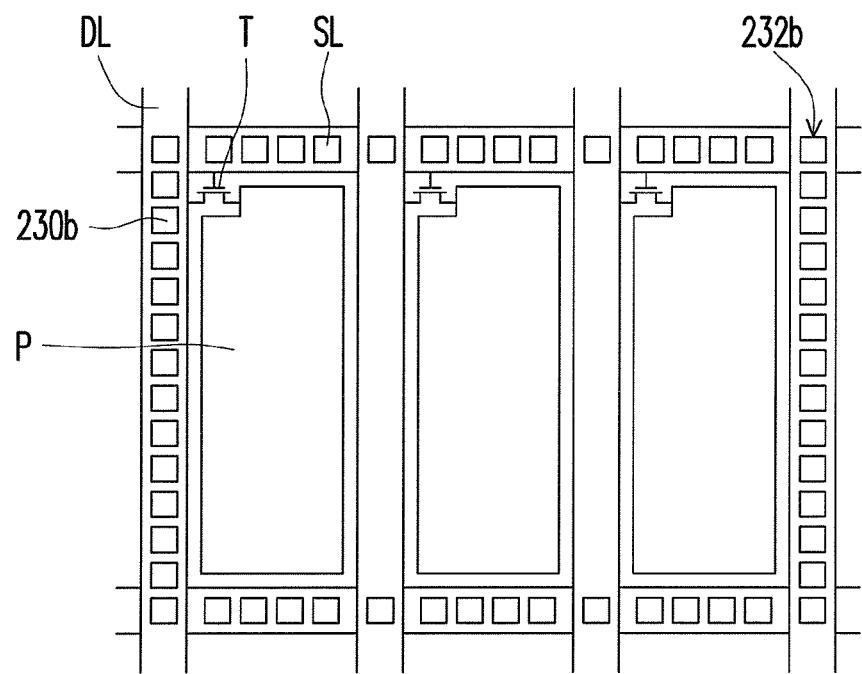
FIG. 7B is a top view of a second substrate of an OCB mode LCD panel according to an embodiment of the present invention.

FIG. 6A is a top view of a first substrate of an OCB mode LCD panel according to an embodiment of the present invention. FIG. 6B is a top view of a second substrate of an OCB mode LCD panel according to an embodiment of the present invention. Referring to FIG. 6A and FIG. 6B, the dot liquid crystal polymer patterns 230a, 230b are closely arranged into ring structures 232a, 232b, respectively. Similarly, the distance between the adjacent dot liquid crystal polymer patterns 230a is between 1~25 μm, and the distance between the adjacent dot liquid crystal polymer patterns 230b is between 1~25 μm. Each of the dot liquid crystal polymer patterns 230a, 230b has an area between 1~225 μm². In the embodiment of FIG. 6A and FIG. 6B, each of the ring structures 232a, 232b encloses one pixel region. However, the present invention does not limit herein. According to another embodiment, the each of the ring structures 232a, 232b may enclose two pixel regions, three pixel regions (as shown in FIG. 7A and FIG. 7B), or more than three pixel regions.

In the embodiment, the dot liquid crystal polymer patterns 230a, 230b are closely arranged into ring structures 232a, 232b, and this arrangement may be applied to an initial Pi-twist mode LCD which may omit the transition from a splay state into a bend state. Usually, the operation of an OCB mode LCD panel includes transiting the liquid crystal molecules from a splay state into a bend state, and then the liquid crystal molecules are twisted with 180°. Because the OCB mode LCD panel of the embodiment has ring structures 232a, 232b which are formed with closely arranged dot liquid crystal polymer patterns 230a, 230b, the liquid crystal molecules 240 may be arranged as initial Pi-twist arrangement. Therefore, after the liquid crystal molecules are transited into a bend state from a splay state, the liquid crystal molecules 240 can be maintained between the bend state and the 180° twisted state. In other words, the repeated transition from the splay state into the bend state is not required, and the liquid crystal molecules 240 can be fast transited between the bend state and the 180° twisted state.

In light of the foregoing, in the OCB mode LCD panel of the embodiments, the transition from a splay state into a bend state can be omitted by closely arranging the dot liquid crystal polymer patterns into linear structures or ring structures. If the dot liquid crystal polymer patterns are arranged into linear structures with lower density or arranged into ring structures with higher density, the liquid crystal molecules can be fast transited into the bend state from the splay state.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optically compensated birefringence (OCB) mode liquid crystal display panel having a plurality of pixel regions, comprising:
   a first substrate, having a first alignment treated layer thereon;
   a second substrate, disposed opposite to the first substrate and having a second alignment treated layer thereon;
   a plurality of dot liquid crystal polymer patterns, disposed on the first alignment treated layer and the second alignment treated layer, each of the dot liquid crystal polymer patterns having an area between 1~225 $\mu m^2$; and
   an OCB liquid crystal material, disposed between the first substrate and the second substrate.

2. The OCB mode liquid crystal display panel as claimed in claim 1, wherein the dot liquid crystal polymer patterns are arranged into a plurality linear structures.

3. The OCB mode liquid crystal display panel as claimed in claim 2, wherein the plurality linear structures are parallel to each other.

4. The OCB mode liquid crystal display panel as claimed in claim 2, wherein the adjacent linear structures are away from each other by at least one pixel region.

5. The OCB mode liquid crystal display panel as claimed in claim 2, wherein a distance between the adjacent linear structures is between 50~200 $\mu m$.

6. The OCB mode liquid crystal display panel as claimed in claim 1, wherein the dot liquid crystal polymer patterns are arranged into a plurality ring structures.

7. The OCB mode liquid crystal display panel as claimed in claim 6, wherein each of the ring structures encloses at least one pixel region.

8. The OCB mode liquid crystal display panel as claimed in claim 1, wherein a distance between the adjacent dot liquid crystal polymer patterns is between 1~25 $\mu m$.

9. The OCB mode liquid crystal display panel as claimed in claim 1, wherein one of the first substrate and the second substrate is an active device array substrate and the other one of the first substrate and the second substrate is a color filter substrate.

10. The OCB mode liquid crystal display panel as claimed in claim 1, wherein the first alignment treated layer and the second alignment treated layer are respectively an alignment treated organic material layer or an alignment treated inorganic material layer.

11. The OCB mode liquid crystal display panel as claimed in claim 10, wherein the alignment treated organic material layer comprises polyimide, polyamic acid, polyamide, polyvinyl alcohol or polyvinyl cinnamate.

12. The OCB mode liquid crystal display panel as claimed in claim 10, wherein the alignment treated inorganic material layer comprises diamond-like carbon, indium tin oxide, silicon oxide or silicon nitride.

* * * * *